(12) United States Patent
Sessa et al.

(10) Patent No.: US 9,829,031 B2
(45) Date of Patent: Nov. 28, 2017

(54) APPARATUS AND METHOD FOR SELECTIVELY APPLYING POWDER COATINGS ONTO INTERNALLY THREADED FASTENERS

(71) Applicant: Nylok LLC, Macomb, MI (US)

(72) Inventors: Eugene Sessa, Harrison Township, MI (US); Raymond Oleskie, Shelby Township, MI (US)

(73) Assignee: NYLOK LLC, Macomb, MI (US)

( * ) Notice: Subject to any disclaimer, the term of this patent is extended or adjusted under 35 U.S.C. 154(b) by 515 days.

(21) Appl. No.: 14/330,725

(22) Filed: Jul. 14, 2014

(65) Prior Publication Data

US 2016/0010677 A1  Jan. 14, 2016

(51) Int. Cl.
*B05B 13/06* (2006.01)
*F16B 37/00* (2006.01)
(Continued)

(52) U.S. Cl.
CPC .............. *F16B 37/00* (2013.01); *B05B 1/00* (2013.01); *B05B 7/1486* (2013.01);
(Continued)

(58) Field of Classification Search
CPC ............................ B05B 13/0627; F16B 37/00
See application file for complete search history.

(56) References Cited

U.S. PATENT DOCUMENTS

| | | | |
|---|---|---|---|
| 5,141,771 A | 8/1992 | DiMaio et al. | |
| 5,362,327 A | 11/1994 | Sessa et al. | |
| 6,554,903 B1 * | 4/2003 | Sessa | B05B 15/0412 |
| | | | 118/306 |

FOREIGN PATENT DOCUMENTS

| | | |
|---|---|---|
| EP | 1174189 A2 | 1/2002 |
| EP | 1473089 A1 | 11/2004 |

OTHER PUBLICATIONS

International Search Report and Written Opinion of the International Searching Authority in PCT/US2015/040104 dated Nov. 2, 2015.

\* cited by examiner

*Primary Examiner* — Xiao Zhao
(74) *Attorney, Agent, or Firm* — Levenfeld Pearlstein, LLC (57) ABSTRACT

An apparatus for applying a thermoplastic powder to internal threads of a fastener includes a vacuum nozzle having an end adapted to engage a first surface of the fastener. A spray tube is sized to be inserted within the bore of the fastener and communicates with a source or sources of thermoplastic powder and pressurized air. A bushing is mounted on the spray tube so that the spray tube is able to slide with respect to the bushing. The bushing is adapted to engage a second surface of the fastener. The spray tube and bushing are movable between clamping positions, where the vacuum nozzle and the bushing engage the first and second surfaces of the fastener, and release positions where the vacuum nozzle and the bushing do not engage the first and second surfaces of the fastener. A fastener holder holds the fastener between the vacuum nozzle and the bushing so that when the vacuum nozzle and the bushing are in the clamping positions, the spray tube enters the bore of the fastener and sprays thermoplastic powder on the internal threads of the fastener with excess thermoplastic powder collected by the vacuum nozzle. The vacuum nozzle and bushing may be machined and to permit either, both or neither of first and second chamfers of the fasteners to also be coated.

24 Claims, 9 Drawing Sheets

(51) Int. Cl.
*B05B 1/00* (2006.01)
*B05B 9/04* (2006.01)
*B05D 1/12* (2006.01)
*B05B 7/14* (2006.01)
*B05B 15/04* (2006.01)

(52) U.S. Cl.
CPC ........ *B05B 9/0426* (2013.01); *B05B 13/0627* (2013.01); *B05B 15/0412* (2013.01); *B05D 1/12* (2013.01)

APPARATUS AND METHOD FOR SELECTIVELY APPLYING POWDER COATINGS ONTO INTERNALLY THREADED FASTENERS

FIELD OF THE INVENTION

The present invention relates generally to devices, systems and methods for applying thermoplastic powder to fasteners and, in particular, to an apparatus and method for selectively applying powder coatings onto internally threaded fasteners.

BACKGROUND

A number of manufacturing processes attach fasteners having internally threaded bores with open ends, to components by welding. Parts or other components may then be attached to the fasteners using bolts or other externally threaded fasteners in downstream assembly operations.

Figure 1:
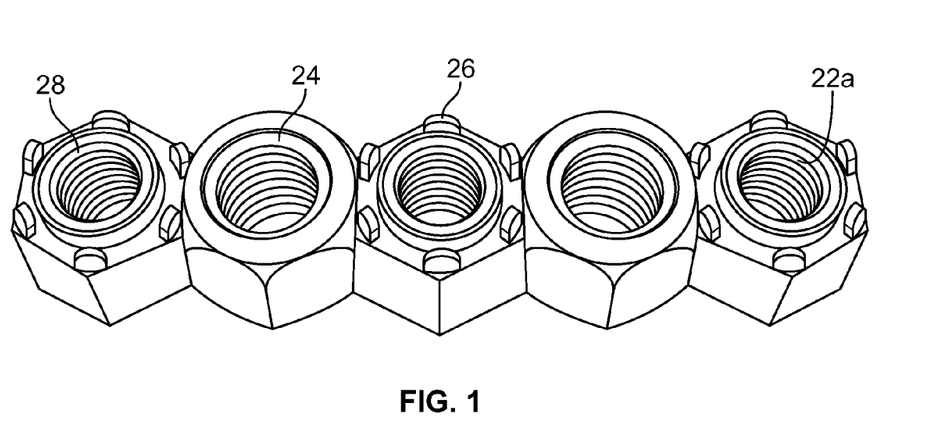
FIG. 1 is a perspective view of a group of hexagonal nuts having weld projections and where the internal threads and chamfers of the nuts may be coated using embodiments of the apparatus and method of the present invention.

Examples of such fasteners are the hexagonal nuts indicated in general at 20 in FIG. 1. As illustrated in FIG. 1, each nut features an annular chamfer portion 22a and internal threads 24 formed within the wall of the bore of the nut. The opposite sides of the nuts 20 not visible in FIG. 1 each include a second annular chamfer portion. The nuts are provided with weld projections 26, which are used to weld the nut to a component or part.

Coatings of thermoplastic material, such as fluoropolymer coatings (28 in FIG. 1), are often applied onto the internal threads of the nuts, or other fasteners. As an example only, the thermoplastic material may be TEFLON. The purpose of the fluoropolymer coating is to prevent the build-up of post applied primers, paints and weld spatter on the threads 24 of the fasteners. This prevents fouling of the threads that would otherwise impede downstream assembly operations. The threads are coated up to, and sometimes including, the top (22a) and bottom chamfers that are at the start and the end of the threads 24.

When applying fluoropolymer powders into internally threaded fasteners, such as the nuts of FIG. 1, it is sometimes difficult to prevent the fluoropolymer powder from getting onto the external surfaces of the nuts. This is particularly true when the chamfers must be coated with the fluoropolymer material as well. Thermoplastic material on the exterior surfaces of the fasteners causes paint or primer not to stick and could cause other downstream process problems. In addition, it has been noted that if the projections 26 of the weld nuts get contaminated with the fluoropolymer coating, welding failures and welding equipment damage may result.

Systems and methods for coating the internal threads of fasteners are known. Examples include commonly owned U.S. Pat. No. 5,141,771 to DiMaio et al. and U.S. Pat. No. 5,362,327 to Sessa et al. Each of these patents, however, discloses a nozzle arrangement that uses a fixed vacuum nozzle positioned above a nut opposite a spray nozzle. The fixed vacuum nozzle collects the over-sprayed powder. Such fixed vacuum nozzle designs, however, have limitations with regard to permitting the chamfers to be coating while keeping the outside surfaces of the fastener clean.

In view of the above, a need exists for a method and apparatus that generally prevents the fluoropolymer powder from escaping from the spray zone and getting on the fastener exterior surfaces.

A need also exists for a method and apparatus that provides the option to either coat the top chamfer, the bottom chamfer, neither chamfer or both chamfers of the fastener at the same time.

DETAILED DESCRIPTION OF EMBODIMENTS

Figure 2:
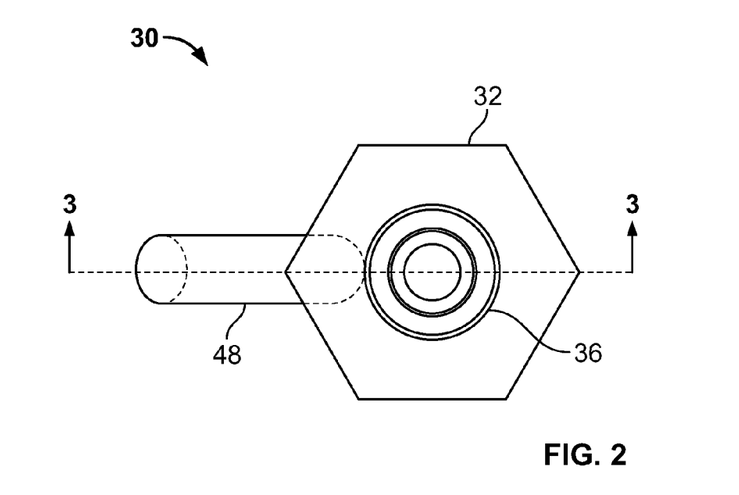
FIG. 2 is a top plan view of a vacuum nozzle and a spray nozzle assembly and a nut to be coated in an embodiment of the apparatus of the present invention.
Figure 3:
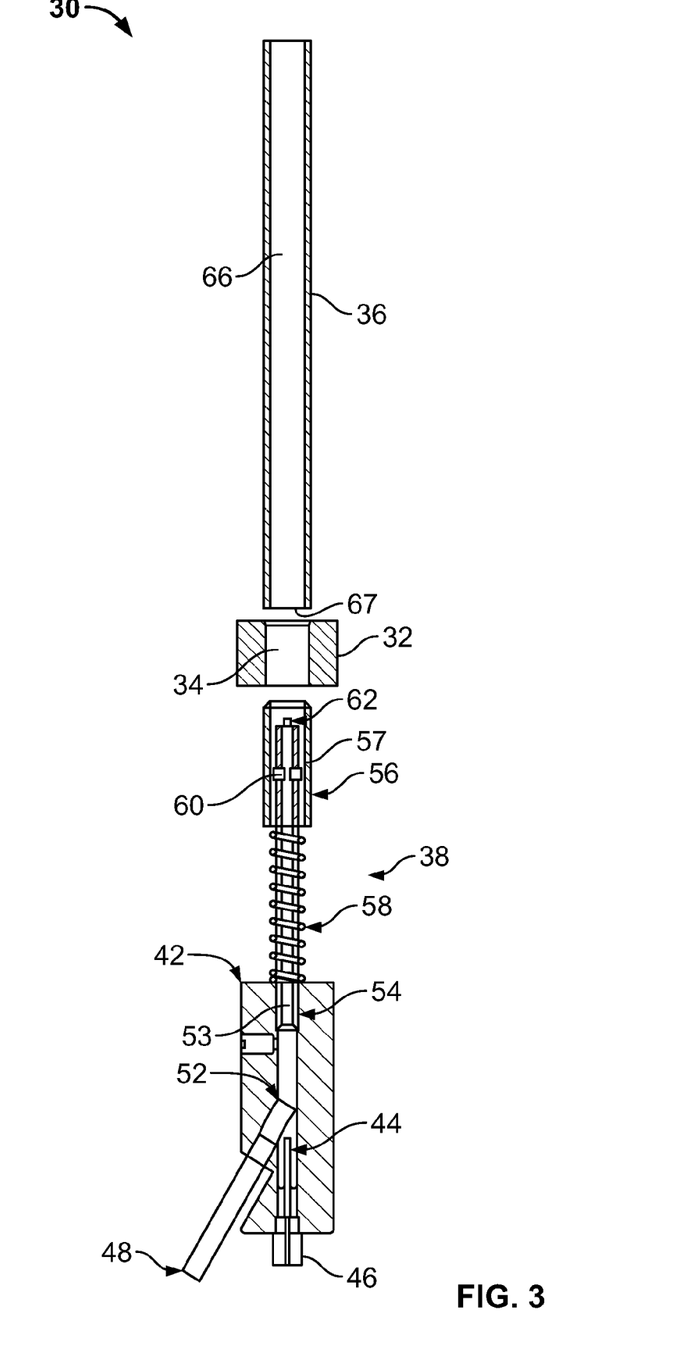
FIG. 3 is a cross-sectional view of the vacuum nozzle, spray nozzle assembly and nut of FIG. 2 taken along line 3-3 of FIG. 2.

The spray nozzle assembly and vacuum nozzle portion of an embodiment of the apparatus of the present invention is indicated in general at 30 in FIGS. 2 and 3. A nut 32 having an internally threaded bore 34 is shown positioned in alignment with a vacuum nozzle 36 and a spray nozzle assembly, indicated in general at 38. An embodiment of the system for placing the nut in such a position will be described below. While the invention is described below in terms of a nut, it is to be understood that other types of internally threaded fasteners having bores open at each end could be processed by the present invention.

As illustrated in FIG. 3, the spray nozzle assembly 38 includes a powder pump body 42 that is attached to the proximal end of the spray tube and houses a compressed air jet 44 which receives pressurized air through an air supply line or tubing (not shown) that is connected to air inlet connection 46. A powder inlet connection 48 is connected to a powder feeder via a powder supply line or tubing (not shown). As a result, a thermoplastic powder, such as a fluoropolymer powder, mixes with the air stream from compressed air jet 44 at junction 52 and the resulting powder stream is provided to the spray passage 53 of a spray tube 54. While the embodiments are described below as using a fluoropolymer powder, it is to be understood that alternative embodiments could use other thermoplastic powders.

A machined bushing 56 features a central bore and is fitted over the top or distal end portion of the spray tube 54 and a compression spring 58 is positioned between the powder pump body 42 and the machined bushing 56 and urges the machined bushing into the position shown in FIG. 3. The central bore 57 of the machined bushing 56 is sized so that the spray tube 54 is free to move through the machined bushing in a telescopic fashion. A stop collar 60 is positioned on the spray tube 54 in a fixed fashion and the bore 57 of the machined bushing features an enlarged diameter upper portion through which the stop collar may travel. The bore of the machined bushing also features a lower portion having a reduced diameter so that an annular shoulder is formed at the intersection with the top portion of the bore. The annular shoulder of the machined bushing bore 57 engages the underside of stop collar 60 of the spray tube 54 so that upward travel of the machined bushing 56 with respect to the spray tube 54 is limited to the position shown in FIG. 3. The distal end portion of the spray tube is sized to be inserted into the bore of the nut, as described below.

The spray opening or outlet of the spray tube (the open top of the spray tube in the illustrated embodiment) is provided with a spray deflector or diverter 62 so that the powder stream is circumferentially diverted in a generally radial direction. The deflector may take the form of a disk positioned on the top end of a stem, where the bottom end of the stem is positioned within the center of the top end opening of the spray tube 54. The stem holds the disk in spaced relation with respect to the top end of the spray tube so that the powder stream exiting the spray tube is deflected in a generally radial direction by the disk.

Figure 4A:
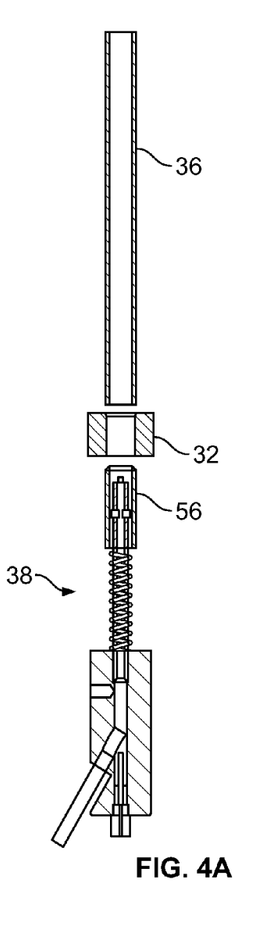
FIGS. 4A-4D show the vacuum nozzle and the spray nozzle assembly of FIG. 3 during stages or steps performed to coat the internal threads of the nut in accordance with an embodiment of the method of the present invention.

Operation of the spray nozzle assembly 38 and vacuum nozzle 36 of FIG. 3 will now be described with respect to FIGS. 4A-4D. FIG. 4A (and FIG. 3) shows the spray nozzle assembly 38, vacuum nozzle 36 and the nut 32 in alignment so that the nut is in position and ready to have its internal threads (of bore 34 in FIG. 3) and chamfers coated with fluoropolymer powder. As illustrated in FIGS. 3 and 4A, the bottom end of the vacuum nozzle 36 is positioned above, and in spaced relationship with, the nut, and the top end of the machined bushing 56 of the spray nozzle assembly 38 is positioned below, and in spaced relationship with, the nut so that both have not yet contacted the nut 32 itself.

Figure 4B:
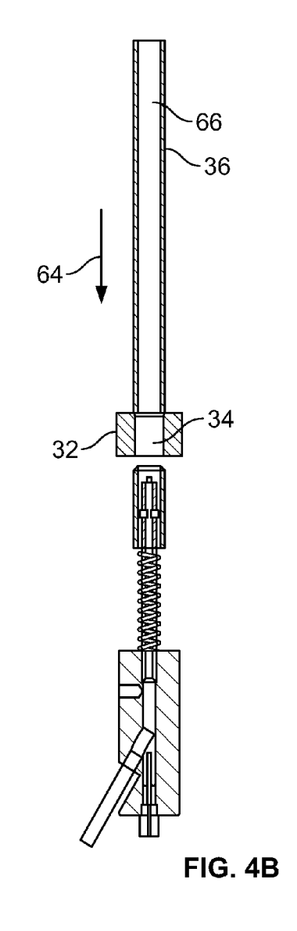

During the next step, as illustrated in FIG. 4B, the vacuum nozzle 36 is lowered onto the top of the nut 32, as indicated by arrow 64. As a result, the interior passage 66 and passage opening 67 of the vacuum nozzle 36 is aligned with the bore 34 of the nut. With reference to FIG. 5A, the bottom end of the vacuum nozzle 36 may be machined to either allow the top chamfer 22a of the nut 32 to be coated (FIG. 5A) or to keep powder off of the top chamfer (FIG. 5B). More specifically, in the embodiment illustrated in FIG. 5B, the end of the vacuum nozzle 36 has been machined with an angle that matches the angle of top chamfer 22a. In the positions illustrated in FIGS. 4B, 5A and 5B, the vacuum nozzle 36 is pressing down on the nut 32 and generally creating a seal or a near-seal. This prevents the powder from escaping and getting on the outside surfaces of the nut during the spray cycle described below with respect to FIGS. 4D and 6.

Figure 4C:
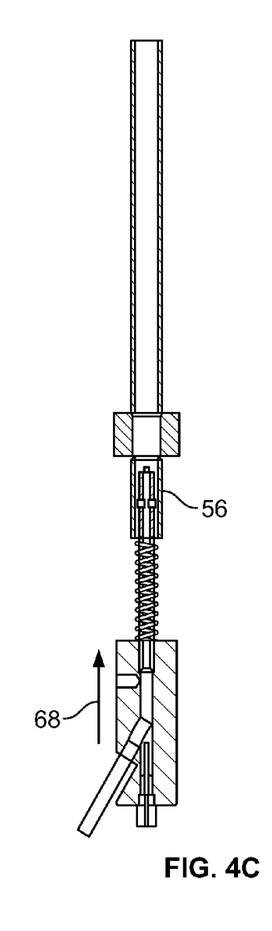

After the vacuum nozzle 36 is in the position illustrated in FIG. 4B, as illustrated in FIG. 4C, the spray nozzle assembly 38 moves upward, as indicated by arrow 68, and the top end of the machined bushing 56 contacts the underside of the nut 32 (also shown in FIGS. 5A and 5B). The machining of the machined bushing 56 may be such that the bottom chamfer 22b of the nut is exposed for coating (as shown in FIGS. 5A and 5B) or covered to prevent the bottom chamfer from being coated (in the manner illustrated for spray nozzle 36 in FIG. 5B).

As illustrated in FIG. 5B by dashed line 71, the longitudinal center lines of the fastener bore, vacuum nozzle interior passage and bushing central bore are preferably aligned when the fastener is clamped between the vacuum nozzle and the bushing.

Figure 4D:
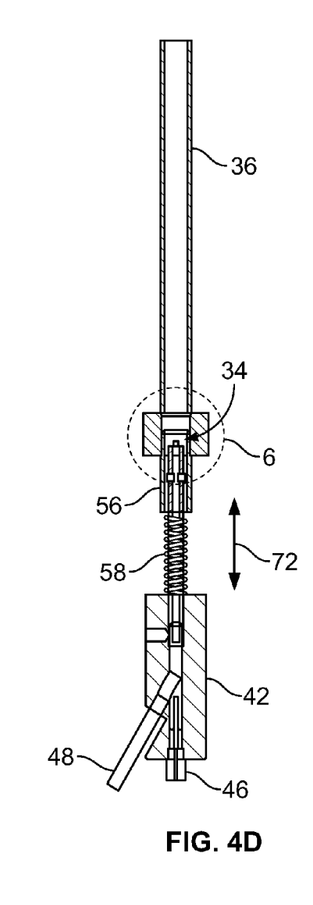
Figure 5A:
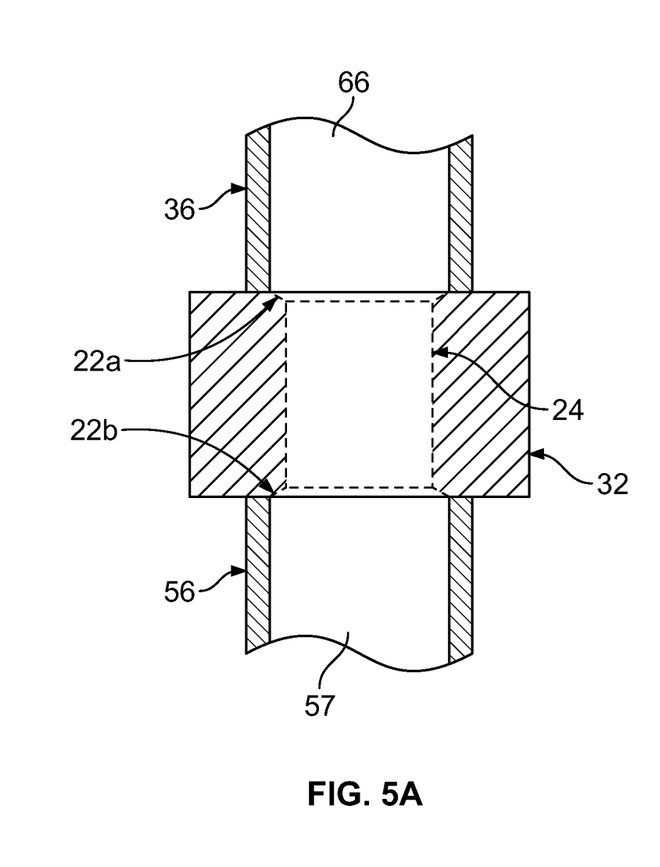
FIGS. 5A and 5B are enlarged views of the nut, bottom end of the vacuum nozzle and top end of the machined bushing of the spray nozzle assembly of FIG. 3 in alternative embodiments of the apparatus of the present invention.
Figure 5B:
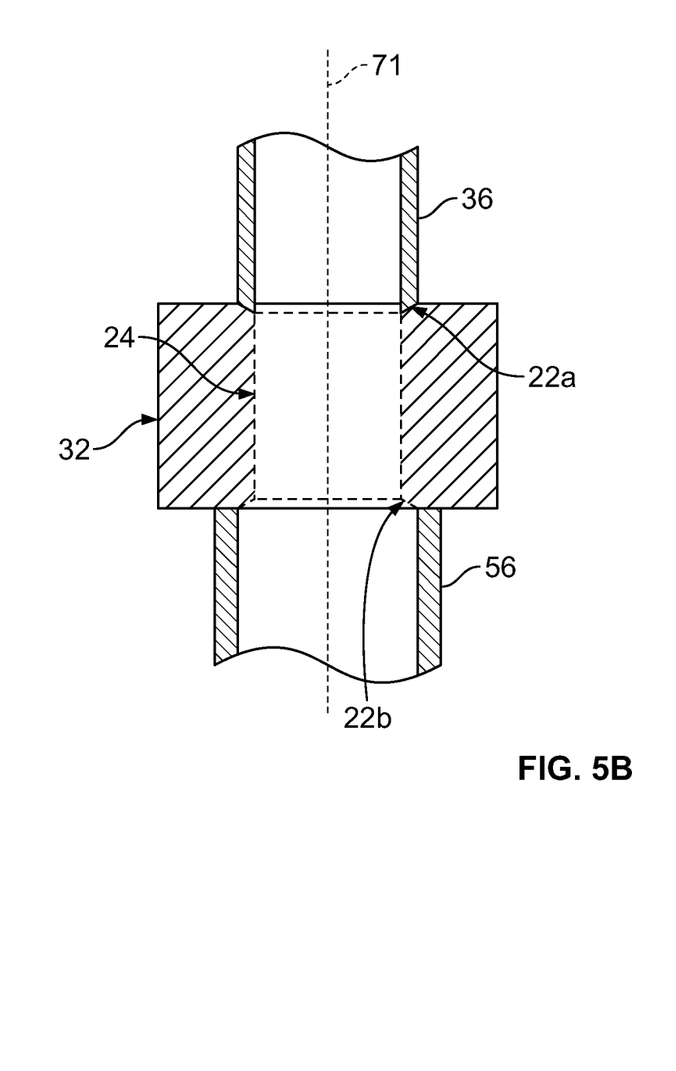
Figure 6:
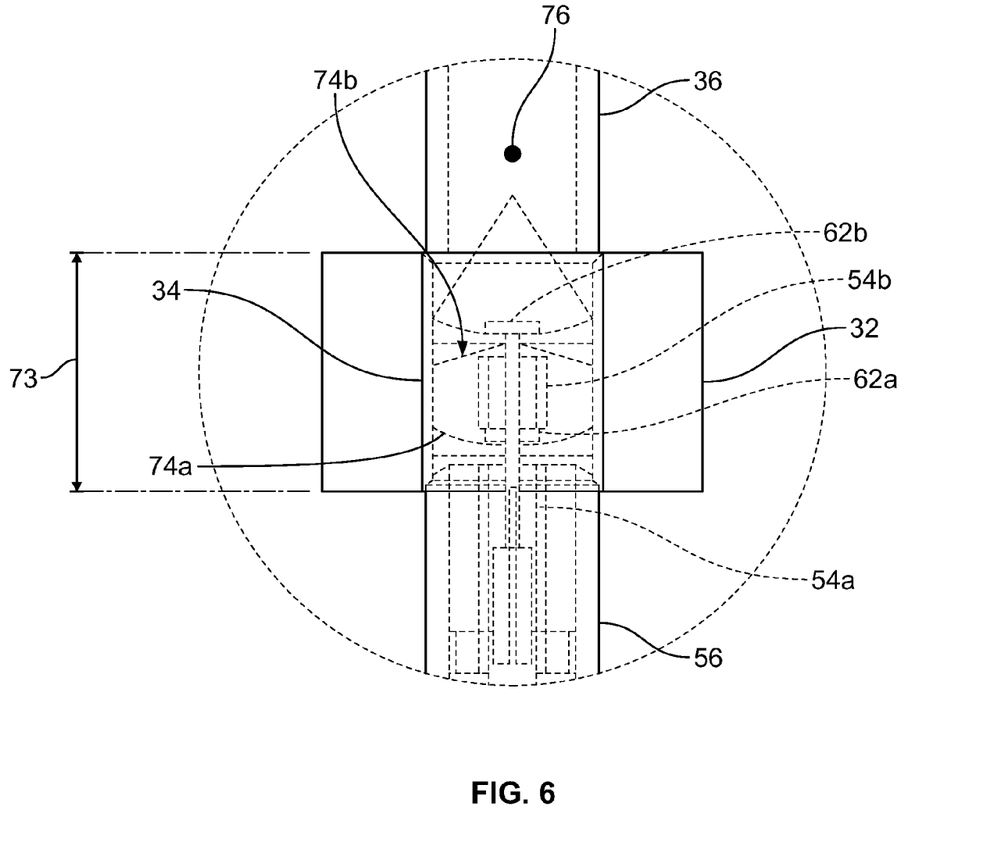
FIG. 6 is an enlarged view of the nut, bottom end of the vacuum nozzle, top end of the machined bushing and spray tube and spray diverter of FIG. 4D.

The powder spray or coating cycle is illustrated in FIGS. 4D and 6. During the powder spray cycle, the spray tube 54 and powder pump body 42 are moved further upwards so that the top end portion of the spray tube and the spray diverter 62 enter the bore 34 of the nut. As the spray tube and powder pump body move upward, the spring 58 is compressed so that the top end of the machined bushing 56 remains seated or in contact with the bottom side of the nut.

When the spray assembly is in position ready to coat the internal threads of the nut, the compressed air jet attached to the air inlet connection 46 of the powder pump body 42 turns on. At the same time, an aspirated powder stream is delivered from the powder feed system thru the powder inlet connection 48 and the vacuum source connected to the vacuum nozzle 36 remains on, having been turned on previously. Indeed the vacuum source connected to the vacuum nozzle 36 may be run continuously during use of the device or system, or may be sequenced to turn on only during this stage or step of the cycle. The spray nozzle is in continuous motion, moved upward to the top of the nut, and reversing downward while spraying powder at the same time, as illustrated by arrows 72 in FIG. 4D. As a result, the top end of the spray tube and the spray diverter are moved up and down within the bore throughout the thickness of the nut (indicated at 73 in FIG. 6) while the powder stream circumferentially exits the spray tube so that the powder stream is sprayed onto the threads of the bore. As explained in greater detail below, the nut 32 has been heated prior to the coating cycle so that the powder forms a coating when it contacts the internal treads and exposed chamber(s) (if any). For example, the powder spray stream 74a corresponds to the spray tube and spray diverter being in the positions indicated at 54a and 62a of FIG. 6, and the powder spray stream 74b corresponds to the spray tube and spray diverter being in the positions indicated at 54b and 62b of FIG. 6.

As indicated at 76 in FIG. 6, as the spray cycle occurs, excess powder is drawn from the process via the vacuum nozzle 36.

When the spray nozzle is at the bottom of the nut, and the coating cycle is complete, the powder stream and the air jet are turned off and the spray tube assembly is returned to a location below the nut (illustrated in FIGS. 4A and 4B), not in contact with it. In addition, the vacuum nozzle is raised into the position illustrated in FIGS. 3 and 4A, allowing the nut to be removed from the coating position. The vacuum source in communication with the vacuum nozzle either continues running or is turned off (if sequenced as explained above).

Because the powder spray is not initiated until after the vacuum nozzle and machined bushing contact the nut, the top surface and the bottom surface of the nut have been "clamped" before the powder spray cycle occurs. This allows for the control of either coating the top chamfer, bottom chamfer, neither chamfer or both chamfers at the same time depending on the machining of the bottom end of the vacuum nozzle 36 and the top end of the machined bushing 56.

Figure 7:
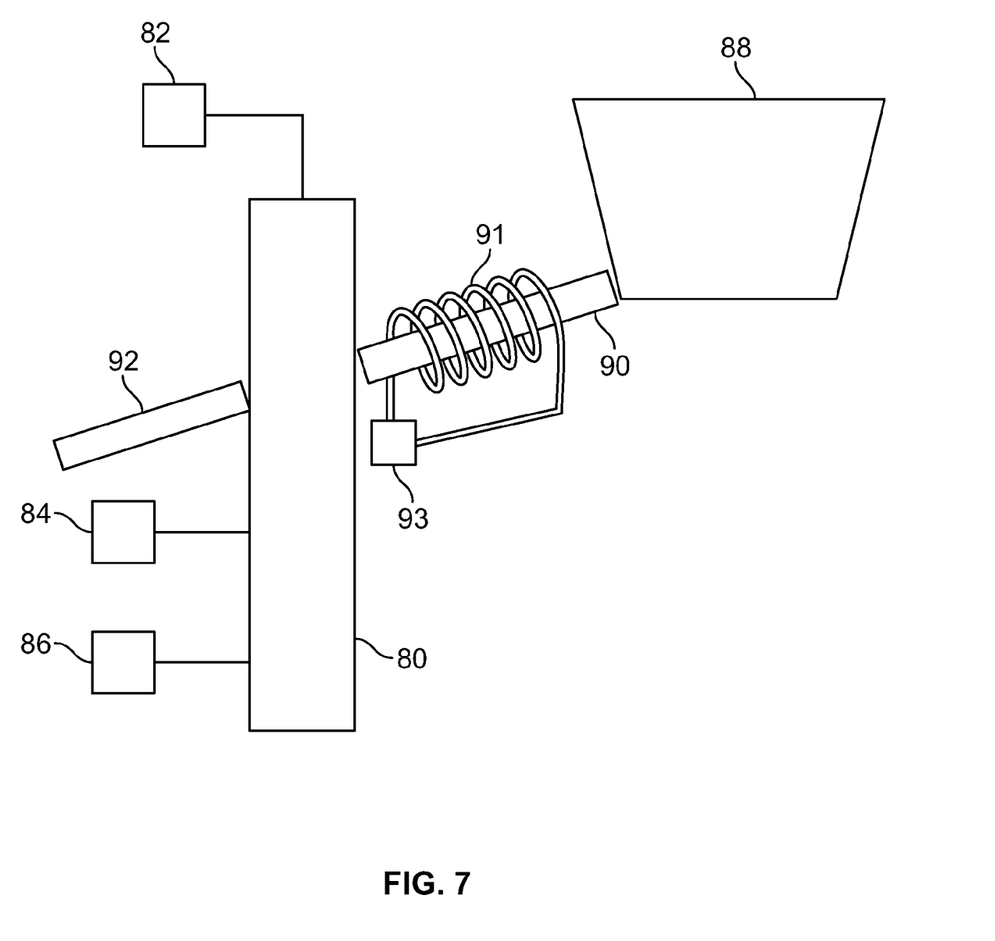
FIG. 7 is a block diagram showing an embodiment of a system incorporating an embodiment of the apparatus of the present invention.

The vacuum nozzle 36 and spray nozzle assembly 38 of FIG. 3 and described above are mounted within a spray station, indicated at 80 in the block diagram of FIG. 7. Also indicated in FIG. 7 is a vacuum source 82 that is connected to the vacuum nozzle 36 to collect excess powder from the coating cycle, as described above. The vacuum source may be, as examples only, a central vacuum or suction system of a building or a dedicated vacuum pump for the spray station. A source of pressurized air 84 is connected to the air inlet connection 46 (FIG. 3) of the powder pump body 42, while a powder feeder 86 is connected to the powder inlet connection 48 (FIG. 3) of the powder pump body 42. As will be described in greater detail below, the spray station 80 receives and positions nuts or other fasteners and moves the vacuum nozzle and spray assembly during the coating and clamping cycles described above with respect to FIGS. 4A-4D.

As illustrated in FIG. 7, a vibratory feeder bowl 88 holds a supply of the nuts (or other fasteners) to be coated. The nuts leave the feeder bowl and travel down a supply ramp 90 in a single file or row to the spraying station 80. As the nuts travel down the ramp 90, they are heated by coil heater 91 and electrical source 93. After the internal threads (and possibly chamfer or chamfers) of a nut are coated, the nut exits the spray station 80 via exit ramp 92. As an example only, ramps 90 and 92 may form an angle of approximately thirty degrees with respect to horizontal.

Figure 8:
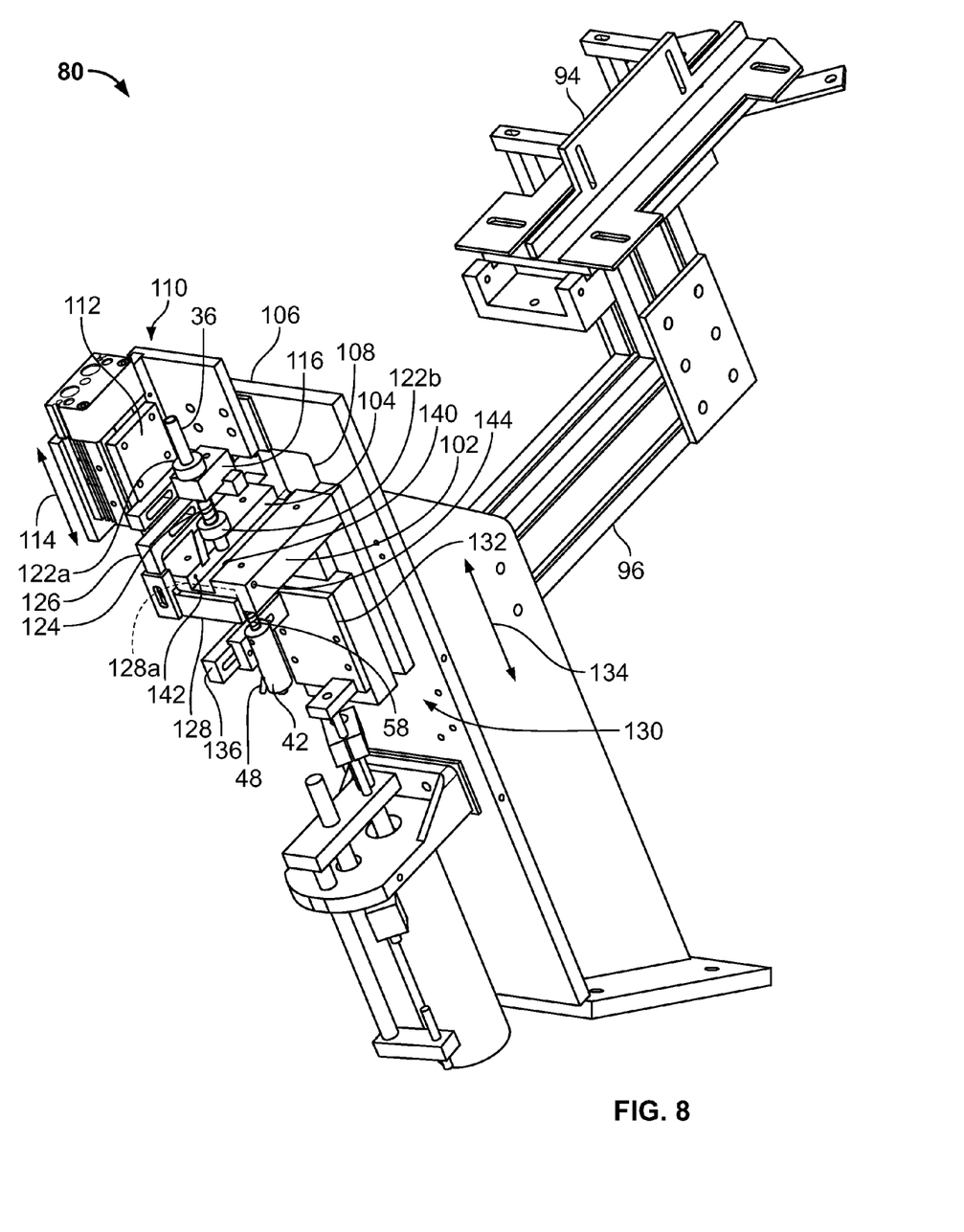
FIG. 8 is a front perspective view of the spray station of FIG. 7 and a feeder bowl and supply ramp support bracket.
Figure 9:
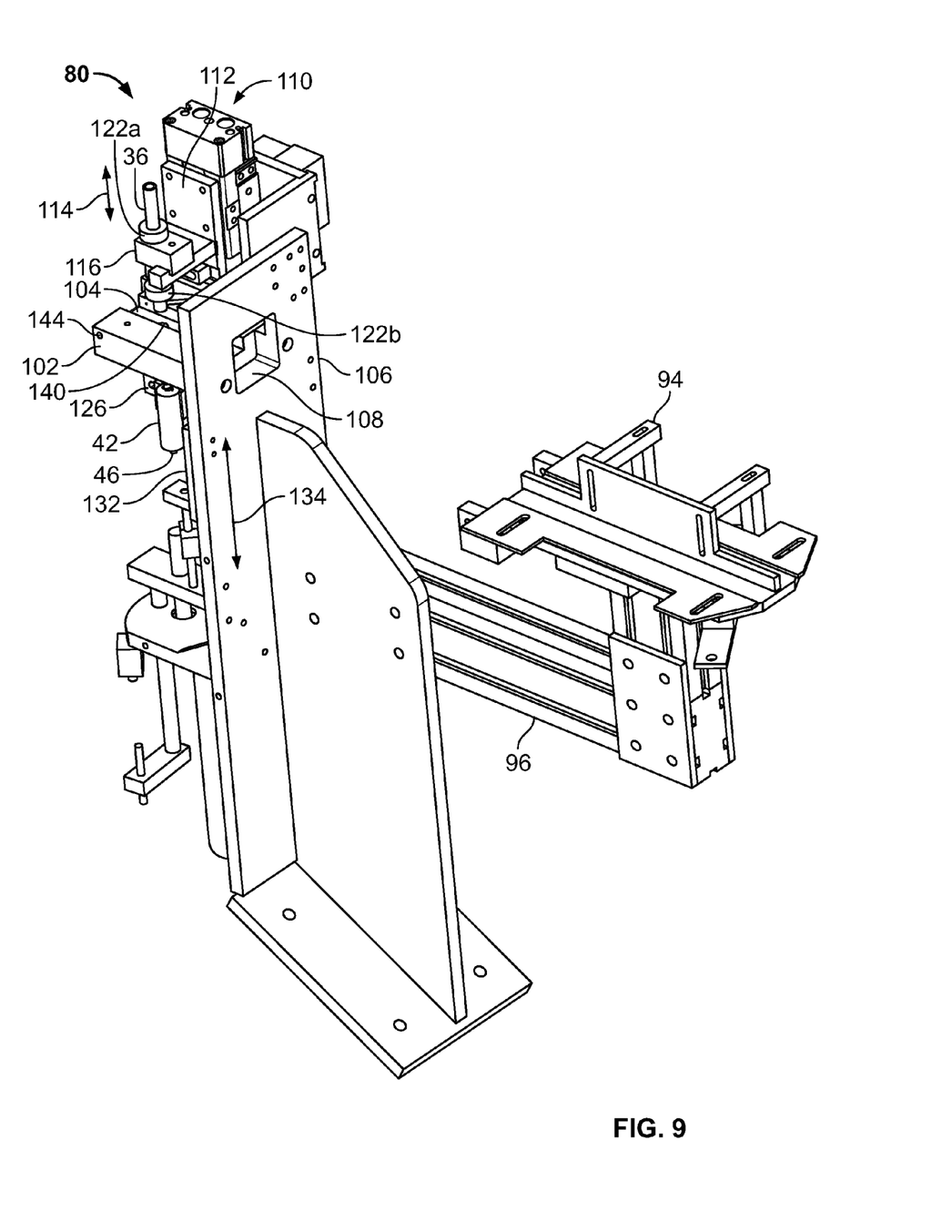
FIG. 9 is a rear perspective view of the spray station and feeder bowl and supply ramp support bracket of FIG. 8.

Front and back perspective views of the spray station, indicated in general at 80, are provided in FIGS. 8 and 9. In addition, the bracket that supports the vibratory feeder bowl (88 of FIG. 7) and the upper end of the supply ramp (90 of FIG. 7) is illustrated at 94 in FIGS. 8 and 9, while the arm that secures the bracket 94 to the spray station is illustrated at 96. The vibratory bowl and the supply ramp have been omitted from FIGS. 8 and 9 for clarity.

Figure 10:
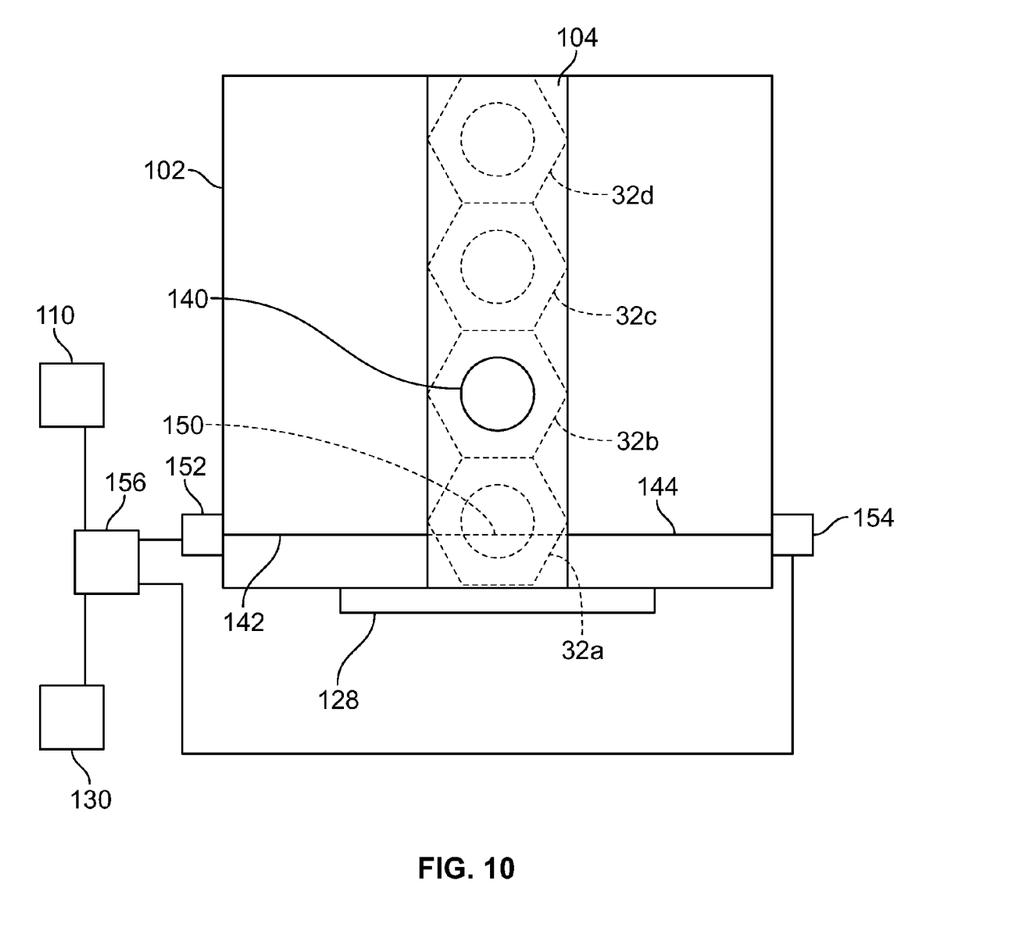
FIG. 10 is an enlarged top plan view of the spray block of the spray station of FIGS. 8 and 9 including a block diagram illustrating an embodiment of the control system of the spray station.

As illustrated in FIGS. 8 and 9, the spray station 80 features a spray block 102 that features a machined fastener channel 104. The spray block is mounted to the framework of the spray station so that the bottom surface of the fastener channel 104 forms an angle of around thirty degrees with horizontal. Of course, alternative angles may be used. A top view of the spray block 102 and the machined fastener channel 104 are provided in FIG. 10. As illustrated in FIG. 10, the fastener channel is sized so that the heated nuts, indicated in phantom at 32a-32d may be held and travel through in a single file or row. As a result, and as explained in greater detail below, the fastener channel serves as a fastener holder for the coating process. Of course alternative holding arrangements and devices may be used as the fastener holder in alternative embodiments.

Returning to FIGS. 8 and 9, the spray station features a support plate 106 upon which the components of the spray station are mounted. The support plate 106 features a window 108 which receives the lower end of the supply ramp (90 of FIG. 7) and through which the nuts travel to the spray block 102.

A pneumatic upper slider mechanism, indicated in general at 110 in FIGS. 8 and 9, features an upper slider plate 112 that moves up and down, as indicated by arrows 114. As an example only, the slider mechanism may be an MXS series slider available from SMC Corporation of America of Noblesville, Ind.

A vacuum nozzle holder 116 is mounted to the slider plate 112 and features a passage sized to receive the vacuum nozzle 36 in a sliding fashion. The open top end of the vacuum nozzle is connected to the vacuum source (82 of FIG. 7) via a vacuum line or tubing. The vacuum nozzle 36 is provided with upper and lower collars 122a and 122b, respectively. A compression coil spring 124 is positioned between the bottom of the vacuum nozzle holder 116 and the lower collar 122b so that the vacuum nozzle is urged into the position shown in FIGS. 8 and 9. The upper collar 122a limits downward travel of the spray nozzle 36 with respect to the vacuum nozzle holder 116.

An L-shaped bracket 126 (FIG. 8) is also secured to the slider plate 112 and supports a fastener stop or gate 128 positioned at the exit of the machined fastener channel 104 of the spray block 102. Due to the attachment with the slider plate 112, the fastener gate 128 may be moved between the release position illustrated in FIGS. 8 and 9, and the raised or stop position illustrated in FIG. 10 and indicated in phantom at 128a in FIG. 8. As a result, the fastener gate 128 and fastener channel 104 of the spray block form an escapement mechanism for handling the fasteners during the coating process.

A pneumatic lower slider mechanism is indicated in general at 130 in FIG. 8 and features a lower slider plate 132 that moves up and down as indicated by arrows 134. A spray nozzle assembly holder 136 is secured to the slider plate 132. As illustrated in FIGS. 8 and 9, the powder pump body 42 is mounted to the spray nozzle assembly holder 136.

In operation, when the vacuum nozzle 36 and the spray nozzle assembly 38 are in the positions illustrated in FIG. 4A, the fastener gate 128 is in the position raised position illustrated in FIG. 10 and in phantom (at 128a) in FIG. 8. The nuts travel from the vibratory bowl (88 of FIG. 7) down the supply ramp 90, where they are heated by coil 91, and into the machined fastener channel 104 of the spray block 102 into the positions illustrated at 32a-32b in FIG. 10. As illustrated in FIG. 10, nut 32a abuts the raised fastener gate 128 so that the gate serves as a stop.

The nut 32b of FIG. 10 is in the coating position illustrated in FIGS. 4A-4D. In other words, the nut 32 of FIGS. 4A-4D is in the position of nut 32b of FIG. 10.

The vacuum nozzle 36 is moved into the position illustrated in FIG. 4B by lowering the upper slide plate 112 (of FIGS. 8 and 9), and thus the vacuum nozzle holder 116. The coil compression spring 124 causes the bottom end of the vacuum nozzle 126 to gently push down and clamp the top side of the nut with the passage of the vacuum nozzle in alignment with the bore of the nut. While the upper slider plate 112 and vacuum nozzle 116 have been lowered, at this point, the fastener gate 128 is still in the raised position illustrated in FIG. 10 and in phantom at 128a in FIG. 8.

Next, the bottom slider plate 132 is raised so that the spray nozzle assembly 38 is moved into the position illustrated in FIG. 4C. As illustrated in FIGS. 8-10, the bottom of the fastener channel 104 of the spray block is provided with an opening 140 through which the machined bushing 56 (FIGS. 4C and 4D) passes to contact the bottom side of the nut. The bottom slider plate 132 continues to rise and then drops so that the spray tube 54 (FIGS. 3 and 6) passes through the opening 140 of the fastener channel 104 and throughout the thickness of the nut (FIGS. 4D and 6) during the coating cycle as described above.

Once the coating cycle is completed, the upper slide plate 112 travels further downward and the fastener gate 128 is lowered into the position illustrated in FIGS. 8 and 9. As a result, the nut 32a of FIG. 10 travels off of the spray block 102 and down the exit ramp 92 (FIG. 7) to be collected. The nut 32b remains clamped in place by the vacuum nozzle and the machined bushing.

Next, the upper and lower slider plates 112 and 132 are raised and lowered, respectively, so that the vacuum nozzle 36 and spray nozzle assembly 38 return to the positions illustrated in FIG. 4A, and the fastener gate 128 returns to the raised position illustrated in FIG. 10 and in phantom at 128a in FIG. 8. As a result, the nut 32b moves into the position formerly occupied by nut 32a and the nut 32c moves into the position formerly occupied by nut 32b, etc. The above process is repeated.

As illustrated in FIGS. 8-10, the spray block 102 may be provided with apertures 142 and 144 through which a fiber optic beam, indicated in phantom at 150 in FIG. 10, from sensors 152 and 154 may pass to detect when a nut is present in the position occupied by nut 32a. The sensors communicate with the system controller 156 (FIG. 10) that controls the upper and lower slider mechanisms 110 and 130. As a result, the sequencing of the movement of the vacuum nozzle, fastener gate and spray nozzle assembly may be coordinated with the movement of the nuts through the fastener channel 104 of the spray block. For example, when the beam of light 150 passing across the fastener channel 104 is unbroken, the controller 156 knows that the nut in position 32a (FIG. 10) has traveled off of the spray block and the vacuum nozzle and fastener gate are ready to be raised and the spray nozzle assembly is ready to be lowered. When the beam of light 150 is broken, the system knows that a nut has moved into the position of nut 32a (of FIG. 10), and thus that a nut has moved into the position of nut 32b so that the vacuum nozzle may be lowered and the spray nozzle assembly may be raised for the coating cycle. Similar sensors may be used to activate the supply of powder and pressurized air flow to the spray nozzle assembly and to activate the vacuum source for the vacuum nozzle based on the positions of the machined bushing 56 of the spray nozzle assembly and the vacuum nozzle.

Additional details regarding control of the system, and alternative embodiments, are provided in commonly owned U.S. Pat. No. 5,141,771 to DiMaio et al., the contents of which are hereby incorporated by reference.

While the preferred embodiments of the invention have been shown and described, it will be apparent to those skilled in the art that changes and modifications may be made therein without departing from the spirit of the invention, the scope of which is defined by the following claims.

What is claimed is:

1. An apparatus for applying a thermoplastic powder to internal threads of a fastener, where the fastener has a bore containing the internal threads, a first surface and a second surface, the apparatus comprising:
    a) a vacuum nozzle having a vacuum passage and an end having a vacuum passage opening where the end is adapted to engage the first surface of the fastener and the vacuum passage is adapted to communicate with a suction source;
    b) a spray tube having a spray passage and a distal end portion featuring a spray passage opening where the distal end portion of the spray tube is sized to be inserted within the bore of the fastener and the spray passage is adapted to communicate with a source or sources of thermoplastic powder and pressurized air;
    c) a bushing mounted on the spray tube so that the spray tube is able to slide with respect to the bushing, said bushing adapted to engage the second surface of the fastener;
    d) said spray tube and bushing movable between clamping positions, where the end of the vacuum nozzle and the bushing engage the first and second surfaces of the fastener and release positions where the vacuum nozzle and the bushing do not engage the first and second surfaces of the fastener; and
    e) a fastener holder adapted to hold the fastener between the vacuum nozzle and the bushing so that when the vacuum nozzle and the bushing are in the clamping positions, the passage of the vacuum nozzle is in communication with the bore of the fastener and the spray tube is able enter the bore of the fastener and spray thermoplastic powder on the internal threads of the fastener with excess thermoplastic powder collected by the vacuum nozzle.

2. The apparatus of claim 1 wherein the first surface of the fastener includes a first chamfer and the end of the vacuum nozzle is shaped and sized to surround but not cover the first chamfer when the vacuum nozzle is in the clamping position so that the first chamfer is sprayed with thermoplastic powder when the spray tube enters the bore of the fastener.

3. The apparatus of claim 1 wherein the second surface of the fastener includes a second chamfer and the bushing is sized and shaped to surround but not cover the second chamfer when the bushing is in the clamping position so that the second chamfer is sprayed with thermoplastic powder when the spray tube enters the bore of the fastener.

4. The apparatus of claim 1 wherein the first surface of the fastener includes a first chamfer and the end of the vacuum nozzle is shaped and sized to cover the first chamfer when the vacuum nozzle is in the clamping position so that the first chamfer is not sprayed with thermoplastic powder when the spray tube enters the bore of the fastener.

5. The apparatus of claim 1 wherein the second surface of the fastener includes a second chamfer and the bushing is sized and shaped to cover the second chamfer when the bushing is in the clamping position so that the second chamfer is not sprayed with thermoplastic powder when the spray tube enters the bore of the fastener.

6. The apparatus of claim I wherein longitudinal center lines of the fastener bore, the vacuum nozzle interior passage and a central bore of the bushing are aligned when the vacuum nozzle and the bushing are in the clamping positions.

7. The apparatus of claim 1 further comprising a powder pump body adapted to communicate with the source or sources of thermoplastic powder and pressurized air, said powder pump body attached to a proximal end portion of the spray tube.

8. The apparatus of claim 7 further comprising a compression coil spring positioned between the powder pump body and the bushing.

9. The apparatus of claim 1 wherein the spray passage includes a top opening of the spray tube and a flow diverter positioned in spaced relationship with the top opening so that power is sprayed circumferentially in a generally radial direction.

10. The apparatus of claim 1 wherein the fastener holder includes a spray block with a channel formed therein, where the channel is sized to receive the fasteners in a single file and includes a bottom having an opening through which the bushing and spray tube passes.

11. The apparatus of claim 10 wherein the channel includes an exit opening and further comprising a gate positioned over the exit opening, where the gate is attached to the vacuum nozzle so as to move with the vacuum nozzle.

12. The apparatus of claim 11 wherein the bottom of the channel forms an angle relative to a horizontal plane so that fasteners slide therein.

13. A system for applying a thermoplastic powder to internal threads of a fastener, where the fastener has a bore containing the internal threads, a first surface and a second surface, the system comprising:
  a) a source of fasteners, where each fastener has a bore with internal threads;
  b) a vacuum nozzle adapted to communicate with a vacuum source;
  c) a spray tube adapted to communicate with a source or sources of thermoplastic powder and pressurized air, said spray tube sized to enter the bore of the fastener;
  d) a bushing slidably mounted on the spray tube;
  e) a fastener holder adapted to receive a fastener from the source of fasteners and hold the fastener between the vacuum nozzle and the bushing;
  f) said vacuum nozzle and said bushing movable between a clamping configuration where the vacuum nozzle engages the first surface of the fastener positioned in the fastener holder and the bushing engages the second surface of the fastener in the fastener holder and a release configuration where the vacuum nozzle and bushing do not engage the fastener in the fastener holder;
  g) said vacuum nozzle in communication with the bore of the fastener and said spray tube entering the bore of the fastener and spraying thermoplastic powder on the internal threads of the fastener with excess thermoplastic powder collected by the vacuum nozzle when the vacuum nozzle and the bushing are in the clamping configuration.

14. The system of claim 13 further comprising a heater positioned between the source of fasteners and the fastener holder so that the fasteners are heated before they arrive at the fastener holder.

15. The system of claim 13 wherein the first surface of the fastener includes a first chamfer and the end of the vacuum nozzle is shaped and sized to surround but not cover the first chamfer when the vacuum nozzle is in the clamping position so that the first chamfer is sprayed with thermoplastic powder when the spray tube enters the bore of the fastener.

16. The system of claim 13 wherein the second surface of the fastener includes a second chamfer and the bushing is sized and shaped to surround but not cover the second chamfer when the bushing is in the clamping position so that the second chamfer is sprayed with thermoplastic powder when the spray tube enters the bore of the fastener.

17. The system of claim 13 wherein the first surface of the fastener includes a first chamfer and the end of the vacuum nozzle is shaped and sized to cover the first chamfer when the vacuum nozzle is in the clamping position so that the first chamfer is not sprayed with thermoplastic powder when the spray tube enters the bore of the fastener.

18. The system of claim 13 wherein the second surface of the fastener includes a second chamfer and the bushing is sized and shaped to cover the second chamfer when the bushing is in the clamping position so that the second chamfer is not sprayed with thermoplastic powder when the spray tube enters the bore of the fastener.

19. The system of claim 13 wherein longitudinal center lines of the fastener bore, an interior passage of the vacuum nozzle and a central bore of the bushing are aligned when the vacuum nozzle and the bushing are in the clamping configuration.

20. The system of claim 13 further comprising a powder pump body adapted to communicate with the source or sources of thermoplastic powder and pressurized air, said powder pump body attached to the spray tube.

21. The system of claim 13 further comprising a compression coil spring positioned between the powder pump body and the bushing.

22. The system of claim 13 wherein the fastener holder includes a spray block with a channel formed therein, where the channel is sized to receive the fasteners in a single file and includes a bottom having an opening through which the bushing and spray tube passes.

23. The system of claim 22 wherein the channel includes an exit opening and further comprising a gate positioned over the exit opening, where the gate is attached to the vacuum nozzle so as to move with the vacuum nozzle.

24. The system of claim 23 wherein the bottom of the channel forms an angle relative to a horizontal plane so that fasteners slide therein.

* * * * *

UNITED STATES PATENT AND TRADEMARK OFFICE
CERTIFICATE OF CORRECTION

PATENT NO. : 9,829,031 B2
APPLICATION NO. : 14/330725
DATED : November 28, 2017
INVENTOR(S) : Sessa et al.

Page 1 of 1

It is certified that error appears in the above-identified patent and that said Letters Patent is hereby corrected as shown below:

In the Claims

Column 8, Line 8, in Claim 1, "able enter" to read as -- able to enter --.

Column 8, Line 36, in Claim 6, "claim I" to read as -- claim 1 --.

Signed and Sealed this
Fifth Day of June, 2018

Andrei Iancu
*Director of the United States Patent and Trademark Office*